April 12, 1938.    J. D. SULLIVAN    2,113,818

FUSED REFRACTORY

Filed Nov. 19, 1934

INVENTOR.
John D. Sullivan.
BY
ATTORNEYS.

Patented Apr. 12, 1938

2,113,818

UNITED STATES PATENT OFFICE 2,113,818

FUSED REFRACTORY

John D. Sullivan, Columbus, Ohio, assignor to The Battelle Memorial Institute, Columbus, Ohio, a corporation of Ohio Application November 19, 1934, Serial No. 753,637

5 Claims. (Cl. 106—9)

My invention relates to fused refractory. It has to do particularly with the production of a refractory material which has a high melting point and which is chemically and structurally constituted to withstand the corrosive action of slags, gases, metals and other materials at high temperatures. It relates especially to the production of a refractory material which is essentially basic in character.

One of the best basic refractories hitherto available takes the form of bricks made of magnesium oxide and commonly called magnesite bricks. These bricks are ordinarily made by bonding together grains of dead-burned magnesite and, usually, by firing such bricks at elevated temperatures. While such bricks are basic in nature, they are quite porous and are very susceptible to spalling on rapid temperature changes. They usually fail because of failure of the bond between the grains, rather than because of failure of the grain particles, though both factors contribute to failure. Generally, the bond either melts or loses its strength at too low a temperature or it is attacked by slags, metals or vapors to which it is exposed, with the result that interstitial penetration of such slags, metals or vapors causes failure. Furthermore, the bricks are inherently porous and permit influx of slag, metals or vapors that tend to cause failure by disintegration, corrosion, or chemical attack.

Trouble due to porosity and weakness of bond in refractories can be eliminated by subjecting the refractory material to a temperature sufficiently high to cause complete melting of the raw material and then casting the molten mass into molds of predetermined shape and size and permitting the mass to cool and solidify therein. Magnesium oxide, because of its high melting point and resistance to corrosion by basic slags, is an ideal refractory material. However, since the melting point of magnesium oxide is about 2800° C., it is not practicable to melt this oxide and cast it into desired shapes. In the first place, it can only be melted in an electric furnace and it reacts with the carbon electrodes thereof at temperatures much below the melting point of the magnesium oxide to give metallic magnesium and carbon monoxide. The reaction is more rapid with increasing temperatures and is quite vigorous at the melting point of the magnesium oxide. As a result, there is an undue loss of the magnesium oxide by reduction and vaporization, and even if the magnesium oxide can be melted, the product is quite porous because of the blow holes formed therein. As far as I am aware, previous attempts to reduce magnesium oxide to such a fluid state as will permit casting and complete filling of a mold before solidification occurs, have been unsuccessful.

One meritorious solution of this problem has involved the idea of casting magnesium oxide by melting it with a material of lower melting point, such as barium monoxide, calcium oxide or both. In this way, a melting point sufficiently low to permit casting of the composition was obtained.

One of the objects of this invention is to produce a high melting point refractory of an essentially basic character and with chemical and structural characteristics which will be such as to impart to the product a longer life than such products as those bricks formed by bonding together grains of dead-burned magnesite or the like.

Another object of this invention is to produce such a product by the use of comparatively cheap and plentiful materials and at a comparatively low cost.

Another object of this invention is to produce such a product which will be crystalline in nature and which will be substantially free of vitreous or glassy constituents, so that it need not be annealed to prevent cracking upon cooling but may be used in its original cast state.

Other objects of this invention will appear as this description progresses.

My invention, in its preferred form, contemplates the use of magnesium oxide as a primary constituent of the composition. However, it contemplates the use of one more additional constituent, effective to lower the melting point to an extent sufficient to make possible the casting of the composition into molds of desired dimensions or configurations. The constituent which I preferably use, in addition to magnesium oxide, is silica ($SiO_2$). This silica is used in sufficient proportion to bring about lowering of the melting point to an extent sufficient substantially to obviate reduction and vaporization of the magnesium oxide and to permit completion of the casting operation in molds of desired dimensions and configuration before solidification of the composition occurs. At the same time, the percentage of silica used is sufficiently small that the product obtained will remain essentially basic in character and will be substantially crystalline throughout.

To facilitate understanding of this invention and the nature of my preferred and one modified product, I have prepared two constitutional diagrams, which are shown in the accompanying drawing.

Figure 1:
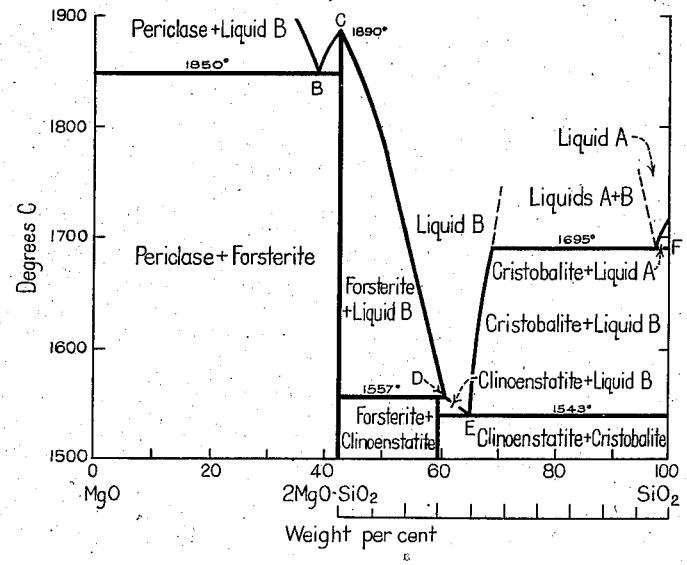
Figure 1 is a constitutional diagram of the system MgO—SiO$_2$.

The diagram of Figure 1 shows the preferred percentage ranges of magnesium oxide and of silica which I utilize in that form of my invention where silica alone is used for reducing the melting point of the magnesium oxide and for producing a composition that can be readily melted substantially without loss by reduction or vaporization and that can be readily cast and the casting operation completed before solidification of the composition intervenes.

It will be seen from this diagram that the mineral forsterite, 2MgO.SiO$_2$, has a melting point of 1890° C. whereas any composition higher in silica than that of forsterite has a lower melting point. Likewise, any such composition lower in silica than that of forsterite has a complete solidification temperature of 1850° C. Forsterite contains 57.3 per cent of magnesium oxide and 42.7 per cent of silica.

My invention, in its preferred form, lies in the use of a mixture of magnesium oxide and silica which contains at least as much magnesium oxide as is found in forsterite. In other words, my invention preferably comprises a composition wherein the magnesium oxide constitutes 57.3 per cent or more of the composition. As a matter of fact, the preferred ranges which I use are 57.3 to 95.0 per cent magnesium oxide and from 5 to 42.7 per cent of silica.

I may use a silica content higher than 42.7 per cent. However, this higher silica content should only be used where very high refractoriness is not necessary.

Although pure oxides can be used and are desirable, since their melting points are higher than impure grades and the resulting product has excellent refractory properties, oxides of ordinary commercial purity are satisfactory. Since they are cheaper than pure oxides, it is frequently desirable to use commercial raw material.

As raw materials, I may use commercial grades of calcined or dead-burned magnesite and silica, ganister, or sand. I may even use raw magnesite which is calcined in the melting operation, as will be described later. In fact, I may use any mineral or compound of magnesium which, by calcination, will yield magnesium oxide. Obviously, I may also use a natural occurring magnesium silicate such as olivine or serpentine as a source of raw material.

As a modification, without departure from this MgO-SiO$_2$ system, mixtures of dolomite, either raw or in the calcined or burned state, and silica may be melted and cast into desired shapes. This modification of my invention, therefore, comprises making a fused refractory product comprising magnesium oxide, calcium oxide and silica. In the preferred form of my invention, when dolomite and silica are employed, I have between 9 and 15 per cent of silica in the fused product. I also prefer to have about 2 or 3 per cent or more of iron or aluminum oxide in the mixture as this tends to stabilize the melt. Natural occurring ingredients may contain these amounts of impurities, or I may employ some clay to supply the aluminum oxide and part of the silica content. I may also use partly dolomite and partly magnesia with the silica to make my fused product. It is obvious, of course, that in my invention instead of dolomite I may employ mixtures of magnesium oxide and calcium oxides.

As previously stated, one solution of the problem of casting magnesium oxide comprised melting it with barium monoxide, calcium oxide, or both. It has been discovered that the addition of silica to the mixture is also desirable because, among other advantages, such an addition results in a product more resistant to slaking in air or in steam.

While my refractory may be melted and tapped or poured, tapping or pouring is not essential to my invention. Likewise, though casting into desired shapes is a particular feature of my invention, for some purposes I may melt the oxides and permit the molten mass to cool and solidify in the furnace; or the molten mass may be tapped or poured into another container, where it may be allowed to cool and solidify. Such practice is within the scope of my invention.

I have found that my refractory can be made by melting the raw materials in an electric furnace. I may employ continuous or batch furnaces. If desired, the furnace used may be of a rotating or oscillating type to effect thorough mixing of the melted ingredients.

The various types of electric furnaces and their operation are so well-known to the metallurgical industry that they need not be described or discussed here. It is only essential that the type of furnace be such that high enough temperature is attained to permit melting of the raw materials, and to permit pouring or tapping of the material in such a state of fluidity that the molten material may be transferred to molds of predetermined shape and dimensions, and then cool and solidify and assume the shape of the mold.

It should be clearly understood that my refractory material is not necessarily limited to a cast product. If desired, it may be used for the manufacture of refractory bricks, furnace linings and bottoms and other articles made by breaking the refractory mass into fragments and incorporating it into desired shapes by tamping, pressing, or by the use of suitable binders.

In most instances, no annealing of the product is necessary. However, some compositions of magnesium oxide and silica or magnesium oxide, calcium oxide and silica should be submitted to an annealing process to prevent cracking during cooling, particularly where the silica content is high enough to produce vitreous or glassy material in the product. Where the silica content is relatively low, as in the preferred form of my invention, no appreciable quantity of vitreous or glassy material is formed and, consequently, no annealing is necessary. However, it may be desirable under certain conditions to anneal, and this is also within the scope of this invention.

It will be apparent that the above-described composition forming the subject matter of my invention has numerous important advantages. Being primarily formed of magnesium oxide, it is possessed of all of those features which render magnesium oxide such a desirable basic refractory.

The product is essentially basic and, having a relatively high melting point, it is highly desirable as a high temperature refractory. Being a cast product, it is free from the objectionable porosity characteristic of articles made from dead-burned magnesite and like products. Also, being crystalline in character, it may be cooled rapidly, so that the delay and expense of annealing is obviated.

It has been found that the product made according to the preferred form of my invention has novel properties not possessed by other cast or bonded refractories. In casting such articles as mullite and magnesium oxide—barium oxide mixtures, unusually large shrinkage takes place during the solidification of the molten mass. In order to prevent formation of a shrinkage cavity, it has been found necessary to use a so-called feeder so that molten material will pass into the mold during solidification and thus fill the potential cavity. The amount of material used in the feeder is about equal in weight to that of the casting; so only approximately one half of the tapped material finds its way into the ultimate casting. This is obviously an expensive process. I have discovered that the product of some forms of my invention has very little tendency to shrink during solidification; so I may eliminate the use of a feeder, or appreciably decrease its size. This is an obvious economic advantage of my process.

Bonded bricks comprising magnesium oxide and silica and also magnesite bricks, are particularly susceptible to slaking by superheated steam. Present bonded bricks of this nature completely disintegrate in one hour in the presence of steam at 320° F. I have subjected fused material made by my process to the action of superheated steam at 320° F. for 6 hours, and no slaking whatever took place. I have, therefore, produced a new article with properties different from any present refractory article.

Another important aspect of the invention is that the materials used are plentiful and readily available, while the method of producing the product is extremely simple. Therefore, the product can be produced quite cheaply, which is a factor of importance at all times and especially under present day conditions.

Figure 2:
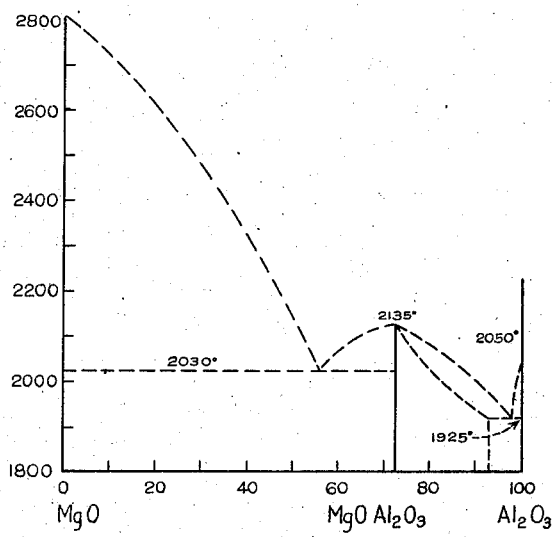
Figure 2 is a constitutional diagram of the system MgO—Al$_2$O$_3$.

As a modification of my invention, I have also ascertained that the melting point of magnesium oxide may be suitably lowered by mixing aluminum oxide (Al₂O₃) with the magnesium oxide. The constitutional diagram of this magnesium oxide-aluminum oxide system is shown in Figure 2. This diagram shows the formation of a compound MgO.Al₂O₃ containing 28.4 per cent of MgO and 71.6 per cent of Al₂O₃, and melting at 2135° C. There is an eutectic between MgO.Al₂O₃ and MgO containing about 55 per cent of Al₂O₃, and melting at about 2030° C. Any mixture higher in MgO than that of the compound MgO.Al₂O₃ is completely solid at 2030° C.

My invention is especially concerned with mixtures containing at least as much magnesium oxide as that present in MgO.Al₂O₃. In other words, it contemplates a composition wherein the percentage of magnesium oxide ranges from 28.4 to 95 per cent while the aluminum oxide ranges from 5 to 71.6 per cent.

The resulting product is primarily basic in nature and the addition of the aluminum oxide to the magnesium oxide results in a material that can be readily cast without material loss due to reduction or vaporization but which has, at the same time, a sufficiently high melting point to produce a highly desirable high-temperature refractory. Moreover, the product is of a crystalline character and need not be annealed.

The compound MgO.Al₂O₃ is commonly known as spinel. So-called spinel bricks have previously been made but they failed in service because these bricks were made by bonding the spinel grains together, and the failure of the brick was due to failure of the bond. The bond either melted or lost its strength at too low a temperature, or was attacked by slags, metals or vapors to which it was exposed. This disadvantage is overcome by this invention in that there is no bond present, and the molten material is cast in a mold of predetermined size and shape. The brick or other product so cast, has virtually no porosity, and is uniform in composition and capable of withstanding the corrosive action of vapors, metals, slags, and glasses.

The method which I preferably use in producing this product consists in mixing the magnesium oxide and aluminum oxide in suitable proportions and melting them in an electric furnace. Such furnaces are so well known to the metallurgical industry that they need not be discussed or described here. After fusion has been effected and the molten mass is at a temperature to permit pouring or tapping and casting, the molten material is cast into a mold of predetermined shape and size and there permitted to cool and solidify so that it assumes the shape and dimensions of the mold. As indicated above, the crystalline nature of the product renders unnecessary the step of slow annealing to prevent cracking during cooling. However, it may be desirable under certain conditions to anneal, and that is also within the scope of this invention.

While pure magnesium oxide and aluminum oxide may be used, and are very desirable because of their refractory nature, it is not essential that pure raw oxides be used. Commercial grades of magnesium oxide may be used, calcined or dead-burned magnesite may be used, or even raw magnesite may be employed since the material is calcined in the furnace operation. The natural mineral brucite may also be employed. As a source of aluminum oxide, commercal aluminum oxide may be used or suitable high-alumina natural-occurring minerals such as beauxite and diaspore may be employed.

It will also be apparent that the materials used to produce this modified composition are plentiful and readily available, while the method of producing the product is extremely simple. Therefore, the product can be produced quite cheaply. Moreover, its characteristics primarily partake of those characteristics of magnesium oxide which are recognized as producing a highly desirable basic refractory for high-temperature service.

In short, this modified composition has many properties that make it valuable to the metallurgical, ceramic, and chemical industries. Because of its basic nature and low porosity, and because of the cheapness of the ingredients that are used in its manufacture, it has many possible uses and is an important contribution to the refractory art.

A still further modification of my invention contemplates the use of iron oxide in a preparation of a refractory material wherein magnesium oxide is the chief constituent and wherein the refractory material is primarily basic. Magnesium oxide and iron oxide alone may be used, or iron oxide may be used in conjunction with magnesium oxide, together with barium oxide and calcium oxide or both.

In the system MgO-Fe₂O₃, a compound

MgO.Fe₂O₃ forms with a melting point of about 1750° C. This compound consists of approximately 80 per cent of Fe₂O₃ and 20 per cent of MgO. However, to obtain a highly refractory product, the Fe₂O₃ content should not exceed about 25 per cent of the mass.

The iron oxide introduced is preferably in the form of the sesqui-oxide, Fe₂O₃. The proper amounts of magnesium oxide and iron oxide may be mixed, and then fed into an electric furnace and melted. After fusion is complete and the molten mass is homogeneous the molten material may be tapped or poured from the furnace and permitted to cool and solidify in a mold of predetermined size and shape. If desired, however, the molten material may be permitted to cool and solidify in the furnace or other container and then broken up into particles or grains for the making of bonded bricks, blocks or linings or tamped products.

The range of iron oxide preferably used by me in the making of this composition may be from 5 to 25 per cent, with the balance magnesium oxide. However, as indicated above, either barium oxide, calcium oxide or both may be used to replace part of the magnesium oxide or of the iron oxide or of both.

It is also within the scope of this invention to melt the iron oxide first, and then to add the magnesium oxide to the molten iron oxide. Likewise, it is possible to melt a mixture containing all of the iron oxide and part of the magnesium oxide and, after fusion is effected, to add the rest of the magnesium oxide and then complete the melting operation. It is further possible to melt all of the magnesium oxide and only a part of the iron oxide, and then to add the rest of the iron oxide to the molten mass, thereafter completing the melting operation.

The last method whereby some of the iron oxide is retained and added after the bulk of the mass has become molten is particularly effective since the iron oxide exerts a scavenging effect on the molten bath and permits removal of such ingredients as carbon which may have entered the bath during the melting operation, since iron oxide is more easily reduced than magnesium oxide. Iron oxide added in this manner will reduce carbides that may be present in the melt. If iron oxide is reduced to metallic iron or to ferro-silicon, these being heavier than the molten refractory material sink to the bottom of the bath and may be readily removed by tapping.

As a source of magnesium oxide, it is not necessary to use pure magnesium oxide. Use of commercial grades are within the scope of this invention. Even raw magnesite may be used, since it is calcined in the furnace operation. However, it is preferable to use the calcined deadburned product. Other minerals of magnesium, such as brucite, either in the raw or calcined state may be used, though, here also the calcined dead-burned product is preferable. Iron oxide need not be pure, and many grades of iron oxide ore will suffice for this invention. It is possible, for example, to use high-grade hematite ore. One may also use the magnetic oxide of iron, Fe₃O₄. This too may be in the form of iron ore. It is obvious that where commercial materials are used, certain impurities may exist in the product but products so produced are nevertheless intended to be within the scope of the claims.

The refractory material produced by this modified composition is, as indicated, primarily basic in character and has a melting point sufficiently high for effective service as a high-temperature refractory suitable for use in the metallurgical, ceramic, and chemical industries. Due to the fusion of the materials, the product is virtually free from porosity. Moreover, it may be cast or broken up into particles or grains for use in the manner previously explained. Whether this refractory material be made by fusing magnesium oxide and iron oxide alone or in combination with barium oxide, calcium oxide or both, it will be crystalline in nature and will not require a long annealing operation and cooling, to prevent cracking. It is within the scope of my invention, however, to anneal the product.

Other materials which I may utilize in conjunction with magnesium oxide to produce a high-melting-point refractory are beryllium oxide, cerium oxide, strontium oxide, chromium oxide, manganese oxide, copper oxide, nickel oxide, cobalt oxide, thorium oxide, boric oxide, titanium oxide and zirconium oxide. One or more of these materials may be mixed with the magnesium oxide in sufficient proportion to lower the melting point thereof so that fusion may be attained without material loss by reduction or vaporization. But at the same time, I preferably limit the quantity of such materials introduced to such an extent that the resulting product will be primarily basic in nature.

Having thus described my invention, what I claim is:

1. An article of manufacture comprising a product produced by melting and fusion of magnesia, silica and iron oxide, with the magnesia content being the chief constituent and being in such proportion with relation to the other oxides that the resulting product will be characterized by iron oxide being in solid solution and with no silicate less basic than the orthosilicate present.

2. An article of manufacture comprising a product produced by melting and fusion of magnesia, silica and iron oxide with the silica in excess of 5 per cent, with the magnesia in excess of 57 per cent and with the iron oxide constituting 2 or more per cent, and substantially only such other materials as will result from the use of commercial materials in making the product.

3. A high melting point basic refractory resistant to corrosion by basic materials produced by melting together a mass of commercial silica and commercial magnesia wherein the said silica varies from 5 to 30 per cent and the said magnesia from 70 to 95 per cent.

4. A high melting point refractory consisting of the solidified product of fused silica, dolomite and iron or aluminum oxide with the said materials employed in such proportions that the fused product contains between 9 and 15 per cent of silica, approximately 2 or 3 per cent of iron or aluminum oxide and the balance substantially all magnesium oxide and calcium oxide in percentages normally resulting from the fusion of dolomite.

5. A high melting point refractory casting resistant to corrosion by basic materials produced by melting together a mass of commercial silica and commercial magnesia wherein the said silica varies from 5 to 30 per cent and the said magnesia from 70 to 95 per cent.

JOHN D. SULLIVAN.